(No Model.)
O. O. STORLE.
VEHICLE RUNNER.
No. 575,742.　　　　　　　Patented Jan. 26, 1897.
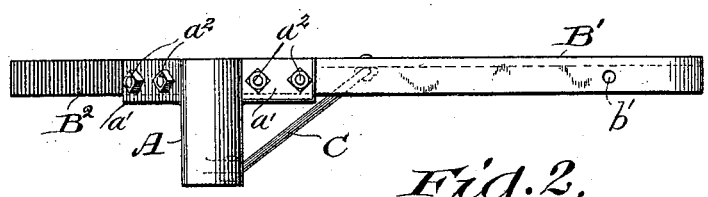
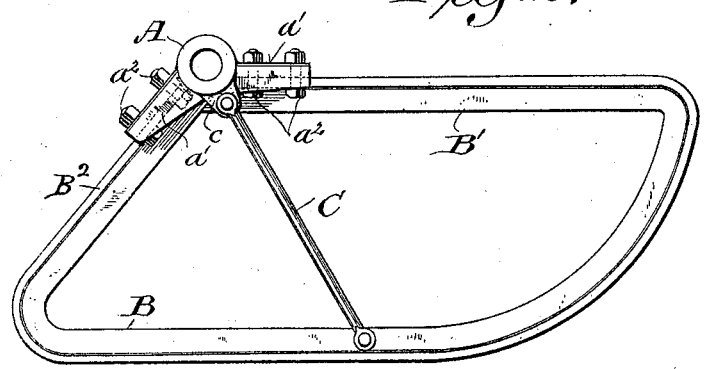
Witnesses:
Geo. W. Young,
Chas. L. Goos.
Inventor:
Ole O. Storle,
By Winter, Flanders, Smith & Bottum
Attorneys.

UNITED STATES PATENT OFFICE.

OLE O. STORLE, OF BURLINGTON, WISCONSIN.

VEHICLE-RUNNER.

SPECIFICATION forming part of Letters Patent No. 575,742, dated January 26, 1897.

Application filed February 20, 1896. Serial No. 579,999. (No model.)

*To all whom it may concern:*

Be it known that I, OLE O. STORLE, of Burlington, in the county of Racine and State of Wisconsin, have invented certain new and useful Improvements in Vehicle-Runners; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to economically produce a light stiff strong runner for temporary use on wheeled vehicles.

It consists of certain novel features of construction hereinafter particularly described, and pointed out in the claims.

In the accompanying drawings like letters designate the same parts in both figures.

Figure 1 is a plan view of a runner embodying my invention, and Fig. 2 is a side elevation of the same.

A designates a cast-iron hub or sleeve approximately fitted and adapted to turn on the spindle of a vehicle-axle. It is formed on opposite sides with flanged ears or attachment-plates $a'$ $a'$, and on its under side at or near its outer end with a perforated ear $c$.

The runner proper, B, fender B', and knee B² are made integrally with each other from a single piece or bar of metal or other suitable material bent or shaped to the proper form. The ends of the runner-bar, which meet or approach each other on the upper side of the runner, are secured to the under side of the ears $a'$ $a'$ on hub A by bolts $a^2$ $a^2$. Any of the various commercial forms of steel or iron, such as angle, channel, tubular, I, T, or Z bars, or even wood, may be employed in the construction of the runner. I have shown, for the purpose of illustration, an ordinary form of angle-iron. As above stated, the runner proper, B, is made in one continuous length or piece with the fender B' and the knee B² without break or joint, except at the ends where it is attached to the hub.

C is a brace bolted or otherwise attached at its lower end to the runner B and extending therefrom upwardly and rearwardly at an angle to the plane of the runner and bolted at its upper end to the ear $c$ on the hub, so as to prevent twisting or lateral deflection of the runner in either direction and to firmly hold it in its proper position. It serves also as an extra knee.

Holes $b'$, as shown in Fig. 1, may be formed in the runner-bars for the attachment of a draft-bar directly thereto.

I claim—

1. A runner for wheeled vehicles, consisting of a cast-iron hub formed on opposite sides with perforated ears or attachment-plates, and a bar bent to form a runner, fender and knee in one piece, and bolted at the ends to said ears or plates, substantially as and for the purposes set forth.

2. A runner for wheeled vehicles, consisting of a cast-iron hub formed on opposite sides with perforated ears or attachment-plates, and on the under side, at or near one end, with a perforated ear, a bar bent to form in a single piece the runner proper, fender and knee, and bolted at the ends to the ears or plates on opposite sides of said hub, and a brace attached at its lower end to the runner proper and at its upper end to the ear on the under side of the hub, substantially as and for the purposes set forth.

3. A detachable runner for wheeled vehicles, consisting of a cast-iron hub adapted to receive and turn on the spindle of a vehicle-axle, and formed on opposite sides with perforated flanged ears or attachment-plates, a bar bent to form the runner proper, fender and knee in one piece, and seated in and bolted at the ends to the flanged plates on said hub, and a brace attached at its lower end to the runner proper and extending upwardly and rearwardly therefrom obliquely to the plane of the runner to the outer end of the hub to which it is attached, substantially as and for the purposes set forth.

In testimony that I claim the foregoing as my own I affix my signature in presence of two witnesses.

OLE O. STORLE.

Witnesses:
CHAS. L. GOSS,
FRED J. WERGIN.